UNITED STATES PATENT OFFICE.

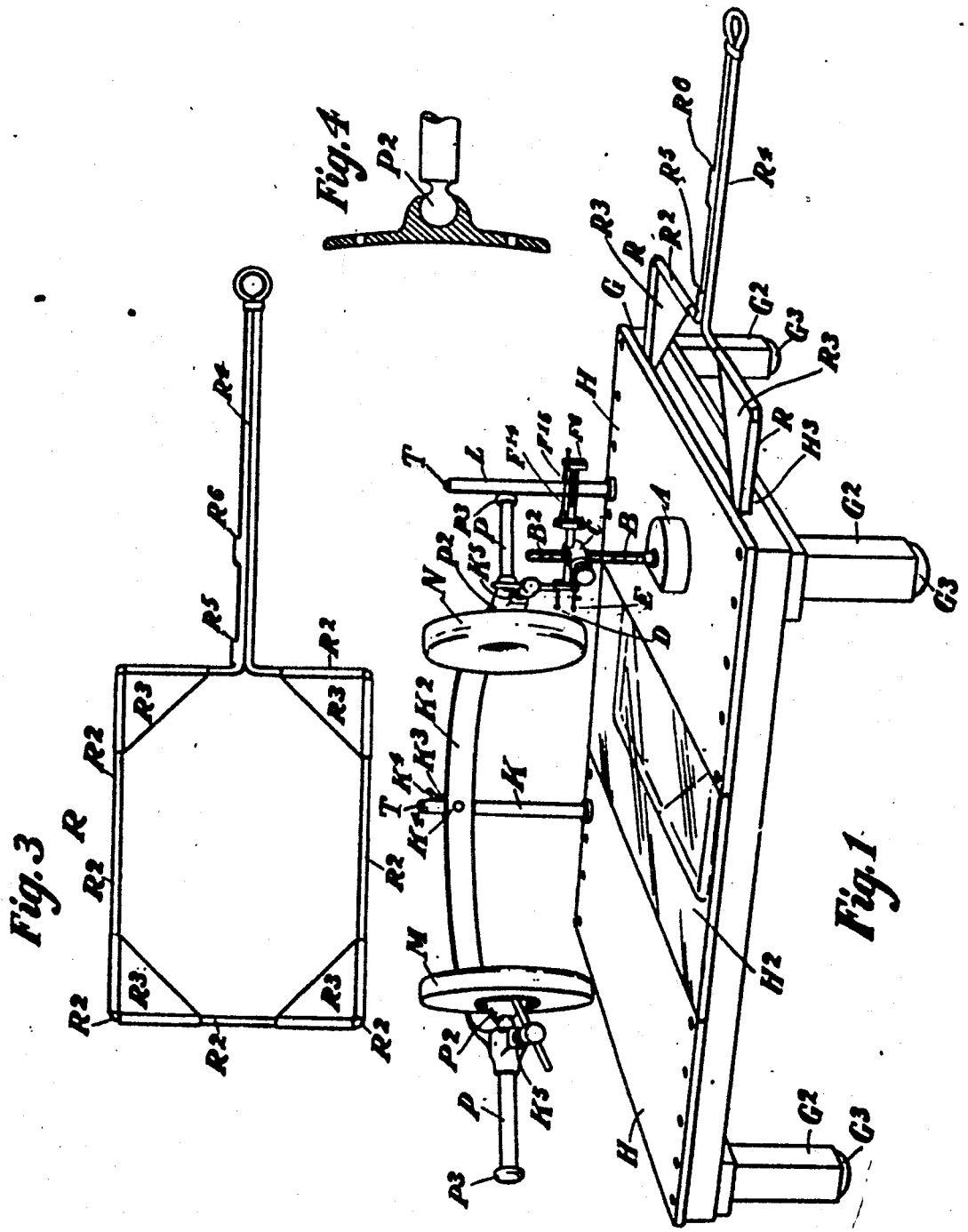

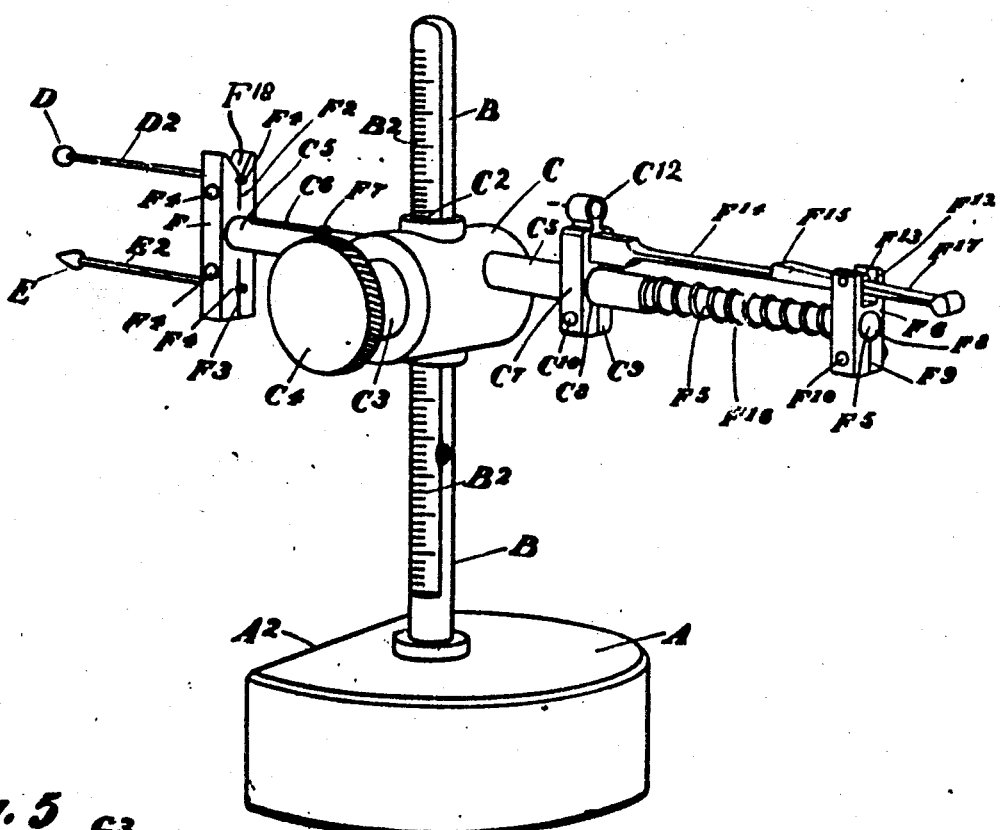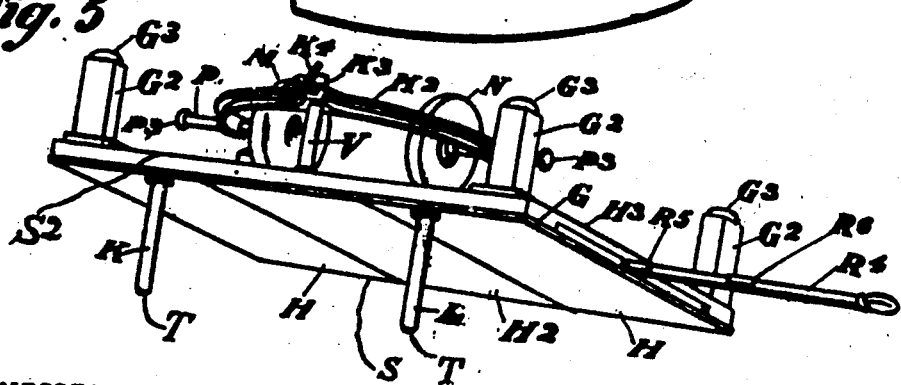

JOHN ROBERT KELLEY, OF CINCINNATI, OHIO.

LOCALIZING APPARATUS.

965,195.　　　　Specification of Letters Patent.　Patented July 26, 1910.

Application filed August 18, 1909. Serial No. 513,436.

*To all whom it may concern:*

Be it known that I, JOHN ROBERT KELLEY, a citizen of the United States, and a resident of the city of Cincinnati, in the county of Hamilton and State of Ohio, have invented certain new and useful Improvements in Localizing Apparatus, of which the following is a specification.

The several features of my invention and the various advantages resulting from their use conjointly or otherwise will be apparent from the following description and claims.

In the accompanying drawings making a part of this specification, and in which similar letters of reference indicate corresponding parts,—Figure 1 is a view in perspective of the mechanism of the apparatus which constitutes my invention. Fig. 2 is a view in perspective of the localizing instrument. Fig. 3 is a top view of the device for holding the photographic plate. Fig. 4 is a detail, partly in section and partly in elevation of one of the universal joints. Fig. 5 is a view in perspective of another position of the table, plate holder, pad-bracket and pads.

I will now proceed to describe my invention.

I constitute the localizing, separable and adjustable device as follows: A indicates the basal block or foundation piece, of great weight to insure stability. The base A of the standard B is cut away so as to be a straight edge. So formed, this base A will not interpose any of itself in the path of the Roentgen ray, and will therefore prevent any obscuration or confusion in the skiagram. In case the table has any straight cross line, such as marked thereon, or as in the present instance the straight edge of the part H, or the part $H^2$, this flat edge can be kept parallel to such edge, and thus aline with the photographic plate. Fixed to this basal block is an upright rod B. This rod B is preferably, in cross section, round, except at one side $B^2$ where it is flat. This rod has a scale of measurements, preferably in millimeters, and this flat side of the rod is a convenient place on which to mark the said graduations. The advantage of such a scale is that the operator can ascertain accurately the height of the indicator (ball D) above the surface of the table, and such knowledge will assist in the measurements necessary to accurately determine the position of the foreign body in the affected eye. On this rod B is located a holder C, slidable up and down on the said rod. The opening $C^2$ of the holder and through which the rod B extends is preferably circular in cross section. Preferred means for setting it at any desired height on the rod consists of the set screw $C^3$ whose screw thread engages a female screw in the holder. This set screw $C^3$ extends through the holder C and bears against the flat side $B^2$ of the rod B. The set screw $C^3$ has a thumb or finger piece $C^4$, preferably of the form of a disk having a milled edge, whereby, when the holder C has been moved to the correct height on the rod B, this set screw $C^3$ may be advanced and hold the holder C at such place on the said rod B, or which the holder is to be moved up or down on the rod B, or to be removed therefrom, this set nut $C^3$ is retracted. This holder carries a tube $C^5$, extending both in front and rear of the holder C. The forward end of this tube $C^5$ has a slot $C^6$. The length of this slot may, of course, be varied to suit the demands of the particular work involved. A preferred length for the purpose for which this invention was primarily made makes the slot of such length relative to the thickness of the projection $F^7$ that the rod $F^5$ and the indicators, viz.: the ball D and the cone E carried thereby can travel ten millimeters. This distance is very slightly in excess of the length of the eyelash. The rear end of this tube $C^5$ carries an abutment $C^7$. This abutment $C^7$ is adapted to be adjusted on the tube $C^5$, and for this purpose is provided with an opening $C^8$ to receive the tube $C^5$, and it is preferably slitted at $C^9$. A set screw $C^{10}$ extends into the abutment $C^7$ and across this slit $C^9$, and holds the abutment $C^7$ clamped tightly on the tube $C^5$.

There are present in this mechanism two horizontally projecting rods. The upper rod $D^2$ carries at its outer and forward end a ball D. The lower rod $E^2$ carries at its outer and forward end a cone E. The purpose of making the lower indicator E of a different shape to wit: of the form of a cone, is to enable the two indicators to be readily distinguished from one another on the skiagram. The ball D is above the cone E. The rear ends of these parallel rods $D^2$ and $E^2$ are duly connected to a bracket F, adapted to permit of these rods $D^2$ and $E^2$ and their respective terminals D and E being adjusted nearer together or farther apart, and the said terminals being set nearer to or farther from the bracket F. Thus the bracket is slitted above at F², which slit receives the rod D², and the bracket is slitted below at F³, which slit receives the rod E². Set screws F⁴ respectively operate to hold the slitted parts of the bracket against the rod D² or E² located in said bracket, thereby clamping the rods D² and E² in the desired relative position, one to the other. They are to be fifteen millimeters apart, and are so set when the instrument is made, thereby obviating the necessity of the operator resetting them. The bracket F is supported by a rod F⁵, which rod extends through the said tube C⁵ and rearwardly beyond this tube C⁵, and terminates in an abutment F⁶. Forward of the holder C, this rod F⁵ is provided with a detent F⁷, which extends upward in the slot C⁶, and limits the distance to which the rod F⁵ can slide back and forth. The abutment F⁶ is preferably clamped on the rod F⁵ and to this end has an opening F⁸ to receive the said rod F⁵. From this slitted opening F⁸ to its lower end it is slitted at F⁹ and this slitted portion is drawn together and caused to tightly embrace the rod F⁵ by the tightening screw F¹⁰. The upper end of this abutment F⁶ is recessed at F¹², and carries a steel cross bar F¹³, which may be termed the trigger bar. A trigger F¹⁴ is pivotally connected to the abutment C⁷. This trigger F¹⁴ is provided with a catch F¹⁵. A spiral spring F¹⁶ embraces the rod F⁵ and is compressed between the end of the tube C⁵ and the abutment F⁶. The mode in which this trigger F¹⁴, F¹⁵ operates is as follows: When the bracket F with the rods D², E² and the rod F⁵ and abutment F⁶, are moved forward, the holder C with its tube C⁵ and its abutment C⁷ remaining stationary, the bar F¹³ moves backward and lifts the trigger F¹⁴, until the catch F¹⁵ falls behind the bar F¹³. By this operation the spring F¹⁶ is compressed. Then the device is in condition for a use hereinafter mentioned. When the operator depresses the trigger by means of the handle F¹⁷ thereof, he disengages the trigger catch F¹⁵ from the bar F¹³, and the rod F⁵ impelled by the spring F¹⁶, moves backward through the holder C and tube C⁵ until the detent F⁷ strikes the rear end of the slot C⁶ of the tube C⁵, at which the extent of the rear travel of the ball D and the cone E is determined.

The instrument is provided with two sights for obtaining the alinement hereinafter mentioned. One of these sights, a notched one F¹⁸, is preferably located as shown on the bracket F. The other of these sights, preferably a peep sight C¹², may be located as shown on the abutment C⁷.

In connection with this localizer, I provide a convenient mechanism for sustaining and holding the head of the patient, and for enabling the localizer to be located in the proper position relative to that eye of the patient of which a skiagram is to be taken, and also for supporting the standards K and L, and also for enabling a photographic plate to be adjusted and held in a proper position for the Roentgen (X)-ray employed to properly print upon the sensitized plate an image of the foreign body lodged in the said eye, and of the indicators E and D from which the position of the foreign body is determined.

G indicates a table duly supported on legs of a proper length. As it is intended that ordinarily, during the investigation of where in the eye the foreign body is located, the patient shall lie upon an operating table on his or her side, the heights of the legs G² are such as to elevate the table G so that while the shoulder is upon the operating table, the head shall be supported at a height convenient to the patient and comfortable to him. In the bottom of each leg G² is, for obvious reasons, a rubber shoe or tip G³.

A clamp to hold the head of the patient firmly in a stationary position is provided. This clamp is duly supported, and for the purpose of having the parts of the machine very compact relatively to one another, and the whole machine to be in one, I erect upon the table the vertical staff or rod K. This rod K in turn supports the horizontal bracket piece K². The latter is provided with a lug K³ having a vertical aperture, which latter receives the upright rod K. A set screw K⁴ screwed through the lug K³ and bearing against the upright rod K enables the bracket piece K² to be set in a higher or lower plane above the table G as occasion may require. Each end portion of this bracket K² carries a head clamp or rest, one of which clamps I have marked M, and the other of said clamps I have marked N. Each clamp is properly a discal pad. Each clamp is connected to a rod P by a universal joint P². Each rod P extends through an opening in that end of the bracket K² which carries it. A thumb nut P³ screwed upon the free end of the rod P enables the rod more readily to be manipulated and moved through the said opening in the bracket, and thus carry the head pad nearer to or farther from the opposite head pad. A set screw K⁵ screwed through the said end portion of the bracket abuts against the rod P and enables the operator after moving the head pad to the desired position to set it, by advancing the set screw K⁵ forcibly against the said rod.

The head pad M is larger than the head pad N. In practice; the head pad M is designed to bear against the back of the head, and the smaller head pad N to bear against the forehead of the patient. Directly beneath the front portion of the head of the patient, and therefore obviously below the eyes of the patient, the upper surface of the table G is of a plate or plates H² preferably of celluloid or other transparent material, that is, of a material which does not interfere with the easy and rapid penetration of the Roentgen ray. The other part or parts H, H, of the table are of metallic material, and are opaque to the penetration of the Roentgen ray during the short time required for exposure.

Provision is made for supporting the photographic plate on which the picture is to be photographed by the Roentgen ray. A bottom or supplemental table H³ is made fast to the table, and is located at such a distance below the table top H, H², H, as to allow of the introduction therein of a plate holder R. This holder preferably consists of a frame R², having corners R³ for the support of this photographic plate. This sensitized plate is covered with a suitable protecting envelop which excludes ordinary white light, and is brought and laid on said holder R, and by it carried into the space upon the supplemental table. This plate is double the size required for one exposure, viz.: for one skiagram and is utilized for the two skiagrams required to be taken in connection with the aforedescribed mechanism.

In order to correctly advance the aforedescribed sensitized plate, I provide a convenient gage, as follows: On the handle R⁴ of this frame R are two projections respectively marked R⁵ and R⁶. When the holder R carrying the sensitized plate is pushed in under the table H, H², as far as the projection R⁵, the first half of the sensitized plate will be present under the said transparent medium H², and upon it the first skiagram will be taken. While this first picture is being made, the second half of the sensitized plate is protected from the Roentgen ray by the said non-penetrable plate H. When the second picture is to be taken, the holder R is moved still farther under the table and as far as the projection R⁶ of the handle R⁴. The first half of the plate has now passed under the metallic plate H of the farthest end of the table, and the second and as yet fresh half of the plate is now in position under the plate H². While this second picture is being made, the first half of the sensitized plate on which a picture has been already taken is protected by the non-penetrable table H.

It should be noted that the standard L is similar to the standard K, and is affixed to the table G, at a point preferably located as near one end of the table as the standard K is located near the other end thereof. Both of these standards K and L are preferably near the same side edge of the table. The standard L is adapted to allow the bracket K² to be affixed to it, similarly as is the standard K.

The mode in which my invention is operated is as follows: The patient, of whose eye the skiagrams are to be made, lies upon an operating table, preferably a table of the regular compression diaphragm type, and his head rests upon the localizing table G. The head of the patient is now fixed in said position by the means for the purpose, which are adjusted as follows: The pad N is located against his forehead and set there by its rod P and the set screw K⁴. The pad M is located against the back of his head and is set there by its rod P and set screw K⁵.

The affected eye should be nearest to the sensitized plate and should therefore be nearest the table G. The visual axis of the eye should be parallel to the plane of the said photographic plate. To accomplish this latter condition, a convenient means is a lighted candle located at a distance of about fifteen feet from the head of the patient, and in front of the face and in a horizontal plane as far above the plane of the table G as the affected eye is above the level of the localizing table G. By these means the visual axes are rendered approximately parallel to the plate. It is now necessary to locate the indicators D and E in position on the table G. It is to be noted that the ball D and the cone E are a fixed distance apart. In the present instance they are fifteen millimeters apart. The cone E is toward the lower temporal side of the head. The ball D and the cone E are moved forward from their supporting post B, and the trigger F¹⁴, F¹⁵ is set. The localizing instrument is advanced toward the eye of the patient until the ball D and the cone E are near the eye of the patient. The localizing device (localizer) is now sighted. The operator now moves the localizer on the table until the post B of this device is in a line with the candle at the rear and with the cornea of the affected eye of the patient. The operator now proceeds to adjust the ball D directly opposite the center of the cornea of the eye. He sights through the peep sight C¹² and through the notched sight F¹⁸. He brings the peep and notched sights into vertical alinement with the center of the cornea by moving the ball to the right or left as may be necessary. He raises or lowers the ball D and those parts fixed to and with it, until this ball is opposite the center of the cornea of the eye, and thus secures the horizontal alinement of the parts.

The peep and notched sights are now in alinement with the said center of the cornea and with the said lighted candle. Now the visual axis of the eye and the ball D and the notched and the peep sights and the objective light (the lighted candle) will be in alinement. The patient then, upon request, closes his eyes. The operator next advances the localizer, pushing the ball D into the lid about the thickness of the lid. He then releases the trigger and the ball through the agency of the spring $F^{10}$ is retracted away from the eye the distance allowed by the rear end of the slot $C^5$. The indicators D and E are now distant from the outer surface of the eye ten millimeters. Therefore they are out of the reach of the eyelashes of the eye of the patient. The latter is directed to open his eyes. It is necessary that the patient has his eyes open while the skiagrams are being made, because, as is well known, when the eyelids are closed, the ball of the eye turns upward. He thereupon opens his eyes, and he is instructed to look at the candle until the exposures are made. The holder having been provided with a sensitized plate, whose corners respectively rest on the corners $R^2$ of the holder, is inserted under the table H, $H^2$, H, and upon the supplemental table $H^3$, and moved forward until the first gage mark $R^5$ is flush with the adjacent edge of the table. The center of the first half of the said plate is now below the affected eye, and the apparatus is in readiness for the first skiagram to be taken. The Roentgen ray apparatus is duly located above the head of the patient, and the focal point of the generating table is preferably in vertical alinement with a theoretical line passing through both eyes of the patient, and meets the plate at right angles thereto. In this position, the exposure with the Roentgen ray is made upon the sensitized plate and thus produces the first skiagram. The tube is then shifted, preferably toward the feet of the patient, usually four or five inches, and tilted slightly, so that the main Roentgen ray will point to the same place which it did before. The holder R is now pushed forward yet farther upon the supplemental table and under the second metal plate H, and the second and fresh half of the sensitized plate is brought under the affected eye of the patient. The Roentgen ray is now again produced and now acts upon this second and fresh half of the sensitized plate and thus produces the second skiagram. The operation of producing these two skiagrams is now complete and the patient is released from his recumbent position.

After the two skiagrams have been produced, the subsequent work prior to the extraction of the foreign body present in the affected eye consists in a series of measurements and calculations therefrom which enable the operator to accurately determine where is the specific and exact location of the foreign body in the eye. These measurements form no part of my invention, but are the same as have been in general use for some years past in which triangulation is the basic principle, viz: the first skiagram having been made with the subject in a recumbent position, the source of penetrating light coming from above, paralleling the two eyes and superimposing the indicator ball, cone and their supporting stems, it will readily be seen that to prolong the shadow cast by said stems would establish the visual axis of the eye, and since the position of the cone is a known distance from the anterior surface of the eyeball, the margin of the said eyeball which is invisible on the skiagram is determined. Therefore by the first picture, the anterior surface of the eyeball, the visual axis of the eye and the lateral medial line of the eyeball is established, and the shadow cast by the foreign body will determine its position relative to the same in all respects except as to lateral depth. In the second skiagram, the ball indicator and the indicator cone and their supporting stems (rods $D^2$ and $E^2$) are no longer superimposed, and computations from the position of the said indicators and of the eyeball and of the foreign body on the second skiagram enable the direction of the Roentgen ray to be determined, and enable the position of this foreign body relative to the lateral depth of the said eyeball to be determined.

When the eye at the right hand side of the head is the one in which the presence of a foreign body is to be localized, the bracket piece $K^2$ with the pads M and N is removed from the standard K, and is turned over and then adjusted upon the standard L. The right side of the head of the patient will then be next to the table H, $H^2$, H, and he will look in a direction toward the left end of the table. The pad N will come against the forehead and the pad M will come against the back of his head. The localizing instrument carrying the indicators D and E is placed on the other end portion of the table and in the same relation to the affected eye as it was when it was being used in relation to the first named eye, viz.: that on the left hand side of the head of the patient. The candle is also located similarly as heretofore in front of the eyes of the patient and at a distance of some fifteen feet. The operations of setting the localizer and of working the Roentgen ray, and the photographic plate are substantially the same as those heretofore described relative to the left eye of the patient. The method of measurement to ascertain the position of the foreign body in the said eye is similar to that first hereinbefore described in relation to the left eye.

An additional function of certain features of my invention is as follows: When it becomes desirable to take a photograph of the head from front to rear, or more especially from rear to front, thereby obtaining a skiagram of the anterior portions of the head, or face of the frontal sinuses and of any foreign bodies in the eye and orbit in such direction, the table G and its accompaniments are handled as follows: The bracket with its pads M and N is removed from its supporting standards K or L, as the case may be. The table is now turned bottom side up. Its long edge S will then rest upon the aforesaid compression table or other proper support, while the other long edge S² will be elevated, because the table in the neighborhood of such edge S² will be supported by the standards K and L, substantially as is illustrated in Fig. 5. Each of the standards has at its free end a rubber stud T, set in a recess in the said free end. When the table G is inverted as now described, the rubber studs T, T, will be on the compression table and thus avoid scratching or marring the compression table. On the under side of table G, and which side is now uppermost, is a standard V, somewhat shorter than any leg G² of the table G. The bracket K² is now adjusted upon this standard V, this standard extending through the eye of lug K³. The set screw K⁴ is now tightened, and the bracket K² is stationary on the said standard V. The patient lying on his stomach on the compression table, then bends his head forward and down and quite close to the table. The side pads M and N are properly advanced to the respective sides of the head and then fixed in place in the manner heretofore mentioned. The Roentgen ray apparatus is duly located above the head of the patient. A sensitized plate is located on the holder R, and this holder with said plate is placed within the table as between the latter and the supplemental table H³. The film side of the said plate must be uppermost. An exposure is now made, and a skiagram of the head, and showing portions of it as heretofore desired, is obtained. The scope of the functions which this table can perform is therefore obviously very great, and its utility is marked. In the making of this last named skiagram, the entire sensitized plate is used.

It will be understood that the material on this under side of the table, which covers the skiagram, is easily penetrable by the Roentgen ray.

What I claim as new, and of my invention and desire to secure by Letters Patent, is:—

1. In an apparatus for correctly localizing foreign bodies in the eye and orbit by means of Roentgen rays, a localizing instrument consisting of two indicators, carried on a support, means for adjusting these indicators vertically relatively to the said support, means adapted to allow these indicators to be set in an advanced position relatively to the standard of the instrument, and means for enabling them to be automatically retracted.

2. In an apparatus for the purposes mentioned, a localizing instrument, consisting of two indicators, both in the same vertical plane and at a given distance apart, a rod for upholding these indicators, a guide in which this rod is slidable, a detent adapted to limit the travel of said indicators, a supporting standard, a sleeve connecting said guide to the said rod, and means for setting said means vertically at a desired height on said rod, a spring adapted to retract said rod and said indicators, and a latch, adapted to hold the rod and the indicators in the advanced position and to be disengaged when the indicators are to be retracted.

3. In an apparatus for the purposes mentioned, a localizing instrument, having two indicators in the same vertical plane and at a given distance apart, a rod for upholding these indicators, a guide in which this rod is slidable, a detent adapted to limit the travel of said indicators, a supporting standard, a sleeve connecting said guide to the said rod, and means for setting said sleeve vertically at a desired height on said rod, a spring adapted to retract said rod and said indicators, and a latch, adapted to hold the rod and the indicators in the advanced position and to be disengaged when the indicators are to be retracted, the said instrument provided with a front sight near the said indicators, and a rear sight farther back on the instrument, in alinement with the upper indicator.

4. In an apparatus for the purposes mentioned, a localizing instrument, having two indicators, distinguished from one another in shape, each indicator having a supporting rod, a bracket which receives said rods, and set screws for tightening the bracket on said rods, a main rod at its front end fixed to the said rod, and at its rear carrying a bracket having a cross bar, a guide tube in which said main rod is slidable, a graduated standard, a holder for the guide tube, said holder slidable vertically on the said standard, a set screw for fixing the holder at a given point on said standard, a trigger latch connected to the guide tube, and having a catch adapted to engage said cross bar when the main rod with the indicators is advanced, a spring on said main rod between the rear end of the guide tube and the bracket on the rear end of the main rod, which spring is adapted to act and retract the main rod and the said indicators when the catch of the latch trigger is disengaged, and means for limiting the travel of the indicators to a given predetermined distance.

5. In a localizing instrument for the purposes hereinbefore mentioned, in which instruments are two indicators, one above the other, and so formed as to be distinguishable from each other, a pair of sights adapted to enable the upper indicator to be put into alinement with them and with the center of the cornea of the affected eye, means for enabling the indicators, after being first pushed against the eyelid to be retracted so as to clear the eyelashes, a support for the indicators, and means for adjusting the indicators vertically.

6. A localizing instrument for the purposes mentioned, in which instrument are two indicators, one above the other, and so formed as to be distinguishable from each other, a pair of sights adapted to enable the upper indicator to be put into alinement with them and with the center of the cornea of the affected eye, means for enabling the indicators, after being first pushed against the eyelid to be retracted so as to clear the eyelashes, a support for the indicators, and means for adjusting the indicators vertically to be automatically retracted so as to be out of contact with the eyelashes, a latch for releasing the indicators so that they can be retracted, means for adjusting the indicators vertically.

7. In an apparatus for the purposes mentioned, a table having two end portions covered by material substantially opaque to the penetration of the Roentgen ray on a short exposure, and a middle portion of a material easily penetrable by the said ray, a standard connected to the table, a bracket adapted to be set thereon, and adjustable up and down on the said standard, pads supported by the bracket, means for advancing and retracting these pads relatively to the bracket.

8. In an apparatus for the purposes mentioned, a table having two end portions covered by material substantially opaque to the penetration of the Roentgen ray on a short exposure, and a middle portion of a material easily penetrable by the said ray, two standards connected to the table, the one on the said impenetrable material on the one side, and the other on the impenetrable material on the other side, a bracket, pads, rods respectively carrying said pads and slidable respectively in the adjacent end portions of the bracket, set screws for setting said rods relatively to the bracket, each pad connected to its rod by a universal joint, the bracket adapted to be adjusted to either standard and to be adjustably set thereon.

9. In an apparatus for the purposes hereinbefore mentioned, the table having end portions each covered with a material substantially impenetrable to the Roentgen ray during a short exposure, and a middle portion covered by a material easily penetrated by the said ray, means for holding the head of the patient on said table, a supplemental table or support below the first named table, a plate holder adapted to be supported by the said supplemental table and to slide thereon, the plate holder having ledges adapted to support the sensitized plate.

10. In an apparatus for the purposes hereinbefore mentioned, the table having end portions each covered with a material substantially impenetrable to the Roentgen ray during a short exposure, and a middle portion covered by a material easily penetrated by the said ray, means for holding the head of the patient on said table, a supplemental table or support below the first named table, a plate holder adapted to be supported by the said supplemental table and to slide thereon, the plate holder having ledges adapted to support the sensitized plate, the plate holder having a rod provided with gages, respectively indicating when the first half of this plate is under the said middle portion of the table and when the second half of the plate is under the middle portion of the table.

11. In an apparatus for the purposes hereinbefore mentioned, the table having end portions each covered with a material substantially impenetrable to the Roentgen ray during a short exposure, and a middle portion covered by a material easily penetrated by the said ray, means for holding the head of the patient on said table, a supplemental table or support below the first named table, a plate holder adapted to be supported by the said supplemental table and to slide thereon, the plate holder having ledges adapted to support the sensitized plate, the plate holder having a rod provided with two projections, one of which indicates when the first half of the said plate is under the middle portion of the table, and the other of which indicates when the second half of the said plate is directly under the middle portion of the said table.

12. In an apparatus for the purposes mentioned, a table provided with two standards, a bracket carrying pads adjustable thereto, the bracket provided with means for enabling it to be received upon either standard and to be vertically set thereon at a desired height, the table having two end portions substantially impervious to the penetration of the Roentgen ray during a short exposure, and a middle portion easily penetrable by the said ray, a plate holder for carrying the sensitized plate, a support therefor adapted to hold the plate when slid under the table, and gages for regulating the advance of the plate holder under the said middle part of the table.

13. In an apparatus for the purposes mentioned, a table provided with two standards, a bracket carrying pads adjustable thereto, the bracket provided with means for enabling it to be received upon either standard and to be vertically set thereon at a desired height, the table having two end portions substantially impervious to the penetration of the Roentgen ray during a short exposure, and a middle portion easily penetrable by the said ray, a plate holder for carrying the sensitized plate, a support therefor adapted to hold the plate when slid under the table, and gages for regulating the advance of the plate holder under the said middle part of the table, a localizing instrument adapted to stand upon said table, and provided with the two indicators, one above the other in the same vertical frame.

14. In an apparatus for the purposes mentioned, a table provided with a standard, a bracket adjustable to the standard, pads adjustable on the bracket, a portion of the table penetrable to the Roentgen ray on a short exposure, a plate holder for holding the sensitized plate, and means for upholding said plate holder to the table, a localizing instrument having two indicators, and means for retracting them at will a given distance.

15. In an apparatus for the purposes mentioned, a table, a bracket and pads, the table having a portion of its surface covered with a material impenetrable to the Roentgen ray for a short exposure, and another portion of its surface covered by a material penetrable to the Roentgen ray, these materials joining each other by a straight line at right angles to the length of the table, a localizing instrument having two indicators in the same vertical plane, and a base whose front side or edge is cut at right angles to the axial length of the localizing instrument, and which edge is adapted to be set parallel to the straight line of the said material of the table.

16. In an apparatus for the purposes mentioned, a table, provided on one side with two standards, the middle portion of the table adapted to allow the Roentgen ray to easily pass through it, a supplemental support for holding the plate holder for carrying the sensitized plate in connection with said table, the reverse side of the table having another standard, a bracket and pads, the pads being adapted to be carried by the bracket and adjustable relatively thereto, and the bracket and the said several standards being mutually interadapted for enabling the bracket to be adjusted on any one of them and to be moved up and down thereon, and to be set thereon at the desired height.

17. In an apparatus for the purposes mentioned, a table, provided on one side with two standards, each having in its outer end a recess, and a rubber terminal piece set in said recess and extending out beyond the adjacent end of the standard, the middle portion of the table adapted to allow the Roentgen ray to easily pass through it, a supplemental support for holding the plate holder for carrying the sensitized plate, in connection with said table, the reverse side of the table having another standard, a bracket and pads, the pads being adapted to be carried by the bracket and adjustable relatively thereto, and the bracket and the said several standards being mutually interadapted for enabling the bracket to be adjusted on any one of them, and to be moved up and down thereon, and to be set thereon at the desired height.

JOHN ROBERT KELLEY.

Attest:
 ALBERT I. SHOCKLEY,
 K. SMITH.